United States Patent
Tawada et al.

(10) Patent No.: US 11,018,495 B2
(45) Date of Patent: May 25, 2021

(54) CONTROL DEVICE FOR ELECTRIC POWER CONVERSION APPARATUS

(71) Applicant: TOSHIBA MITSUBISHI-ELECTRIC INDUSTRIAL SYSTEMS CORPORATION, Chuo-ku (JP)

(72) Inventors: Yoshihiro Tawada, Tokyo (JP); Ruben Alexis Inzunza Figueroa, Tokyo (JP); Tatsuaki Ambo, Tokyo (JP); Masahiro Kinoshita, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/621,724

(22) PCT Filed: Jun. 23, 2017

(86) PCT No.: PCT/JP2017/023251
§ 371 (c)(1),
(2) Date: Dec. 12, 2019

(87) PCT Pub. No.: WO2018/235278
PCT Pub. Date: Dec. 27, 2018

(65) Prior Publication Data
US 2020/0136371 A1 Apr. 30, 2020

(51) Int. Cl.
*H02H 7/122* (2006.01)
*H02J 3/38* (2006.01)
(Continued)

(52) U.S. Cl.
CPC ........ *H02H 7/1222* (2013.01); *H02H 1/0007* (2013.01); *H02J 3/381* (2013.01);
(Continued)

(58) Field of Classification Search
CPC ........... H02J 3/38; H02H 3/16; H02H 7/1222; H02H 1/0007; H02M 7/53871; H02M 1/32
See application file for complete search history.

(56) References Cited

U.S. PATENT DOCUMENTS

2016/0380589 A1* 12/2016 Morita ................ H02H 7/1222
324/509

FOREIGN PATENT DOCUMENTS

| CN | 103107518 B | 9/2015 |
|---|---|---|
| JP | 2015-32601 A | 2/2015 |

(Continued)

OTHER PUBLICATIONS

International Search Report dated Aug. 8, 2017 in PCT/JP2017/023251 filed on Jun. 23, 2017, 2 pages.

(Continued)

*Primary Examiner* — Rexford N Barnie
*Assistant Examiner* — Elim Ortiz
(74) *Attorney, Agent, or Firm* — Oblon, McClelland, Maier & Neustadt, L.L.P.

(57) ABSTRACT

A control device for an electric power conversion apparatus, the control device detecting occurrence of an earth fault in a direct-current path in a system in which the direct-current path between a solar cell module and an electric power conversion apparatus is grounded, is provided. The control device for the electric power conversion apparatus includes: a grounding control unit configured to, in a system in which a direct-current path between a solar cell module and an electric power conversion apparatus is grounded via a switch, control a switch; and an earth fault determination unit configured to, when the switch is open under the controlled of the grounding control unit, detect whether or not an earth fault has occurred in the direct-current path.

1 Claim, 5 Drawing Sheets

(51) Int. Cl.
    *H02M 7/5387*     (2007.01)
    *H02H 1/00*     (2006.01)
    *H02M 1/32*     (2007.01)

(52) U.S. Cl.
    CPC ........... *H02M 1/32* (2013.01); *H02M 7/5387* (2013.01); *H02J 2300/24* (2020.01)

(56) References Cited

FOREIGN PATENT DOCUMENTS

| | | |
|---|---|---|
| JP | 2015-203564 A | 11/2015 |
| JP | 2016-100962 A | 5/2016 |
| WO | WO 2015/098523 A1 | 7/2015 |

OTHER PUBLICATIONS

Indian Office Action dated Jun. 22, 2020 in Indian Patent Application No. 201917053587 (with English translation), 6 pages.
International Preliminary Report on Patentability and Written Opinion dated Jan. 2, 2020 in PCT/JP2017/023251 (submitting English translation only). 8 pages.

\* cited by examiner

CONTROL DEVICE FOR ELECTRIC POWER CONVERSION APPARATUS

FIELD

This invention relates to a control device for an electric power conversion apparatus.

BACKGROUND

PTL 1 discloses a control device for an electric power conversion apparatus. The control device can detect occurrence of an earth fault in a direct-current path between a solar cell module and an electric power conversion apparatus.

CITATION LIST

Patent Literature

[PTL 1] JP 2016-100962 A

SUMMARY

Technical Problem

However, the control device described in PTL 1 is set for a system in which a direct-current path is not grounded. Therefore, the control device may fail to detect an earth fault for a system in which a direct-current path is grounded.

This invention has been made to solve the aforementioned problem. An object of this invention is to provide a control device for an electric power conversion apparatus, the control device being capable of, in a system in which a direct-current path between a solar cell module and an electric power conversion apparatus is grounded, detecting occurrence of an earth fault in the direct-current path.

Solution to Problem

A control device for an electric power conversion apparatus according to this invention includes: a grounding control unit configured to, in a system in which a direct-current path between a solar cell module and an electric power conversion apparatus is grounded via a switch, control the switch; and an earth fault determination unit configured to, when the switch is open under the control of the grounding control unit, determine whether or not an earth fault has occurred in the direct-current path.

Advantageous Effects of Invention

According to this invention, a control device determines whether or not an earth fault has occurred in a direct-current path when a switch is open. Therefore, in a system in which a direct-current path between a solar cell module and an electric power conversion apparatus is grounded, occurrence of an earth fault in the direct-current path can be detected.

DESCRIPTION OF EMBODIMENTS

Figure 1:
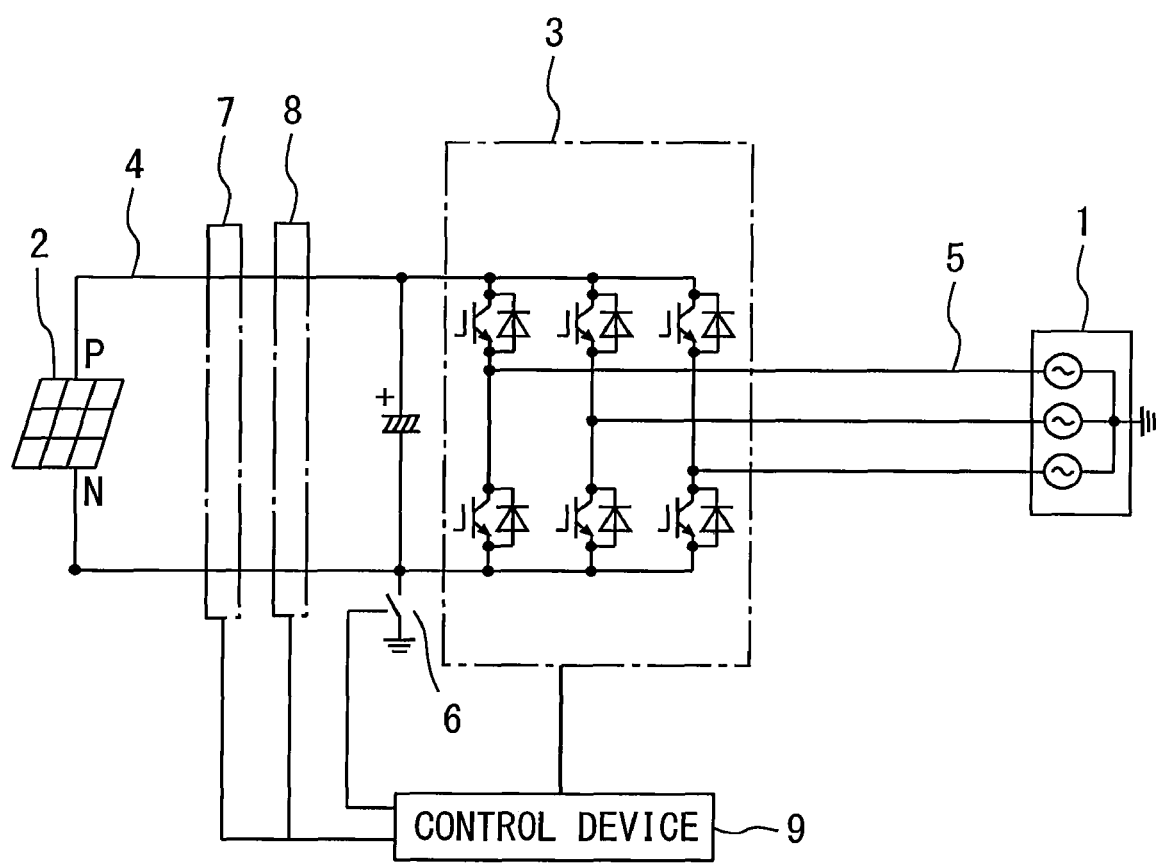
FIG. 1 is a diagram of a configuration of a power supply system to which a control device for an electric power conversion apparatus according to Embodiment 1 of this invention is applied.

An embodiment of this invention will be described with reference to the accompanying drawings. Note that in the drawings, parts that are identical or correspond to each other are provided with a same reference numeral. Overlapping description of such part will arbitrarily be simplified or omitted.

Embodiment 1

FIG. 1 is a diagram of a configuration of a power supply system to which a control device for an electric power conversion apparatus according to Embodiment 1 of this invention is applied.

In FIG. 1, a power supply system includes a power system 1, a solar cell module 2, an electric power conversion apparatus 3, a direct-current path 4, alternate-current paths 5, a switch 6, a voltage detection device 7, an earth fault detection device 8 and a control device 9.

The power system 1 is provided outdoors. The solar cell module 2 is provided outdoors. The electric power conversion apparatus 3 is provided outdoors. The electric power conversion apparatus 3 is provided between the power system 1 and the solar cell module 2.

An input part of the direct-current path 4 is connected to an output part of the solar cell module 2. An output part of the direct-current path 4 is connected to an input part of the electric power conversion apparatus 3. Input parts of the alternate-current paths 5 are connected to respective output parts of the electric power conversion apparatus 3. Output parts of the alternate-current paths 5 are connected to respective input parts of the power system 1.

The voltage detection device 7 is provided in the direct-current path 4. The earth fault detection device 8 is provided in the direct-current path 4. One side of the switch 6 is electrically connected to one of the positive side and the negative side of the direct-current path 4. For example, one side of the switch 6 is connected to the negative side of the direct-current path 4. The other side of the switch 6 is grounded.

An input part of the control device 9 is connected to an output part of the voltage detection device 7 and an output part of the earth fault detection device 8. Output parts of the control device 9 are connected to an input part of the electric power conversion apparatus 3 and an input part of the switch 6.

For example, the power system 1 is operated by a power company. The solar cell module 2 converts energy of sunlight into direct-current power. The electric power conversion apparatus 3 receives supply of the direct-current power from the solar cell module 2 via the direct-current path 4.

The electric power conversion apparatus 3 coverts the direct-current power into alternate-current power. For example, the electric power conversion apparatus 3 converts the direct-current power into three-phase alternate-current power. The electric power conversion apparatus 3 supplies the alternate-current power to the power system 1 via the alternate-current paths 5.

The voltage detection device 7 detects the direct-current voltage from the solar cell module 2. The control device 9 controls operation of the electric power conversion apparatus 3 and opening/closing of the switch 6 based on a result of the detection by the voltage detection device 7.

When the switch 6 is open, the earth fault detection device 8 detects whether or not an earth fault has occurred in the direct-current path 4. The control device 9 determines whether or not an earth fault has occurred in the direct-current path 4, based on a result of the detection by the earth fault detection device 8.

Next, a major part of the control device 9 will be described with reference to FIG. 2.

Figure 2:
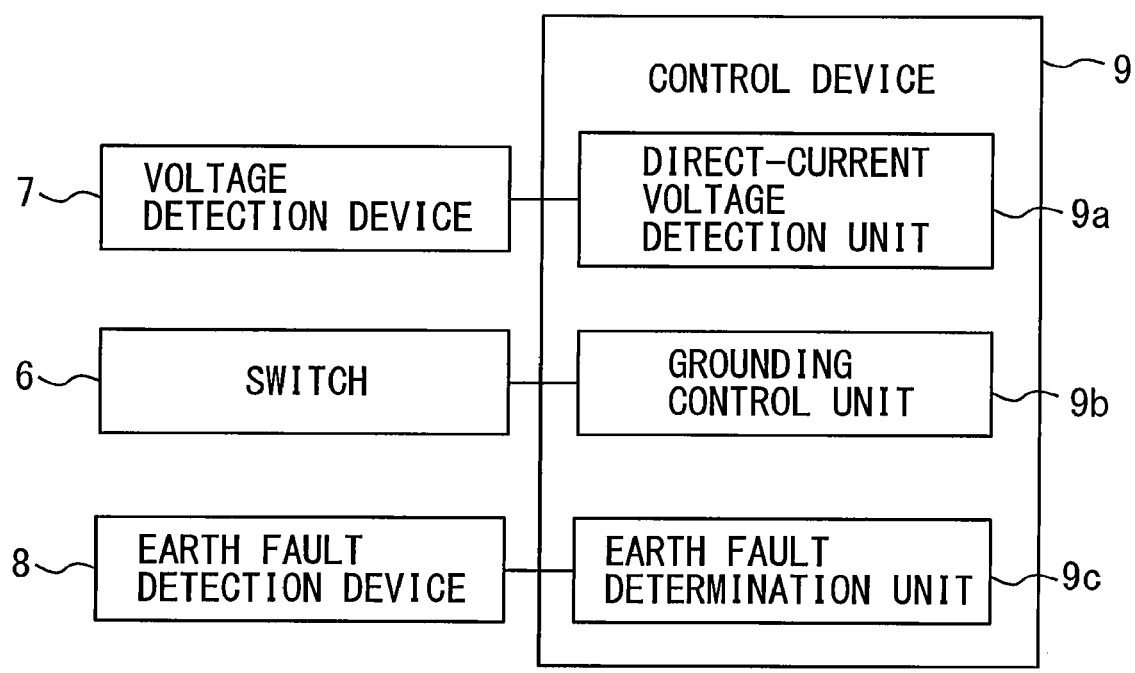
FIG. 2 is a block diagram of a major part of the control device for an electric power conversion apparatus according to Embodiment 1 of this invention.

FIG. 2 is a block diagram of a major part of the control device for an electric power conversion apparatus according to Embodiment 1 of this invention.

As illustrated in FIG. 2, the control device 9 includes a direct-current voltage detection unit 9a, a grounding control unit 9b and an earth fault determination unit 9c.

The direct-current voltage detection unit 9a detects the direct-current voltage output from the solar cell module 2, based on a value of the detection by the voltage detection device 7. For example, the grounding control unit 9b decides whether or not to open the switch 6, based on a result of the detection by the direct-current voltage detection unit 9a. When the switch 6 is open under the control of the grounding control unit 9b, the earth fault determination unit 9c determines whether or not an earth fault has occurred in the direct-current path 4, based on the result of the detection by the earth fault detection device 8.

Next, examples of timings for earth fault determination will be described with reference to FIG. 3.

Figure 3:
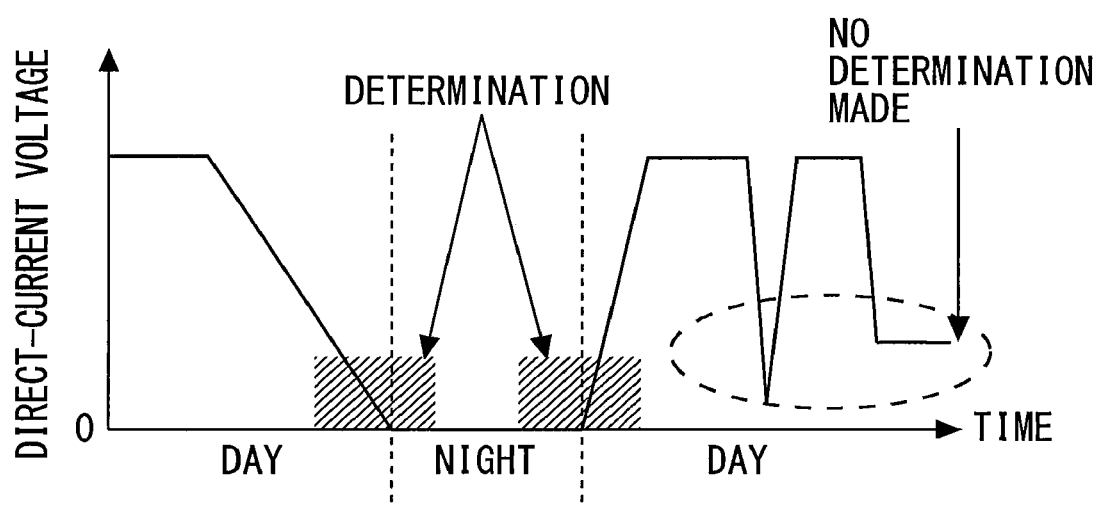
FIG. 3 is a diagram for describing examples of timings for earth fault determination by the control device for an electric power conversion apparatus according to Embodiment 1 of this invention.

FIG. 3 is a diagram for describing examples of timings for earth fault determination by the control device for an electric power conversion apparatus according to Embodiment 1 of this invention. The abscissa axis in FIG. 3 represents time. The ordinate axis in FIG. 3 represents the direct-current voltage detected by the direct-current voltage detection device 7.

If a first setting is set, during a gradual decrease of a value of the direct-current voltage to zero, when the direct-current voltage detection unit 9a detects the direct-current voltage having a value that is smaller than a preset threshold value, the earth fault control unit 9b determines whether or not to open the switch 6. For example, the grounding control unit 9b determines whether or not to open the switch 6, based on a length of time passed from last earth fault determination.

More specifically, based on the length of time passed from the last earth fault determination, the grounding control unit 9b determines whether or not a current time is a time in a period of transition from day to night. If the current time is a time in a period of transition from day to night, the grounding control unit 9b opens the switch 6 using the direct-current voltage. If the current time is not a time in a period of transition from day to night, the grounding control unit 9b does not open the switch 6.

When the switch 6 is open under the control of the grounding control unit 9b, the earth fault determination unit 9c determines whether or not an earth fault has occurred in the direct-current path 4, based on the result of the detection by the earth fault detection device 8, using the direct-current voltage.

In the first setting, the grounding control unit 9b closes the switch 6 at a preset timing. For example, the grounding control unit 9b closes the switch 6 using the direct-current voltage detected by the direct-current voltage detection unit 9a, before the value of the direct-current voltage becomes zero. For example, the grounding control unit 9b closes the switch 6 using the direct-current voltage detected by the direct-current voltage detection unit 9a when the value of the direct-current voltage gradually increases after the value of the direct-current voltage becoming zero.

If a second setting is set, during a gradual increase of the value of the direct-current voltage to a preset threshold value after the value of the direct-current voltage becoming zero, when the direct-current voltage detection unit 9a detects the direct-current voltage having a value that is smaller than the threshold value, the grounding control unit 9b opens the switch 6 using the direct-current voltage. In this state, the earth fault determination unit 9c determines whether or not an earth fault has occurred in the direct-current path 4, based on the result of the detection by the earth fault detection device 8, using the direct-current voltage.

In the second setting, the grounding control unit 9b closes the switch 6 using the direct-current voltage at a preset timing. For example, when the direct-current voltage detection unit 9a detects the direct-current voltage having a value that is smaller than a threshold value, the grounding control unit 9b closes the switch 6 using the direct-current voltage.

Next, an overview of operation of the control device 9 when the first setting is made will be described with reference to FIG. 4.

Figure 4:
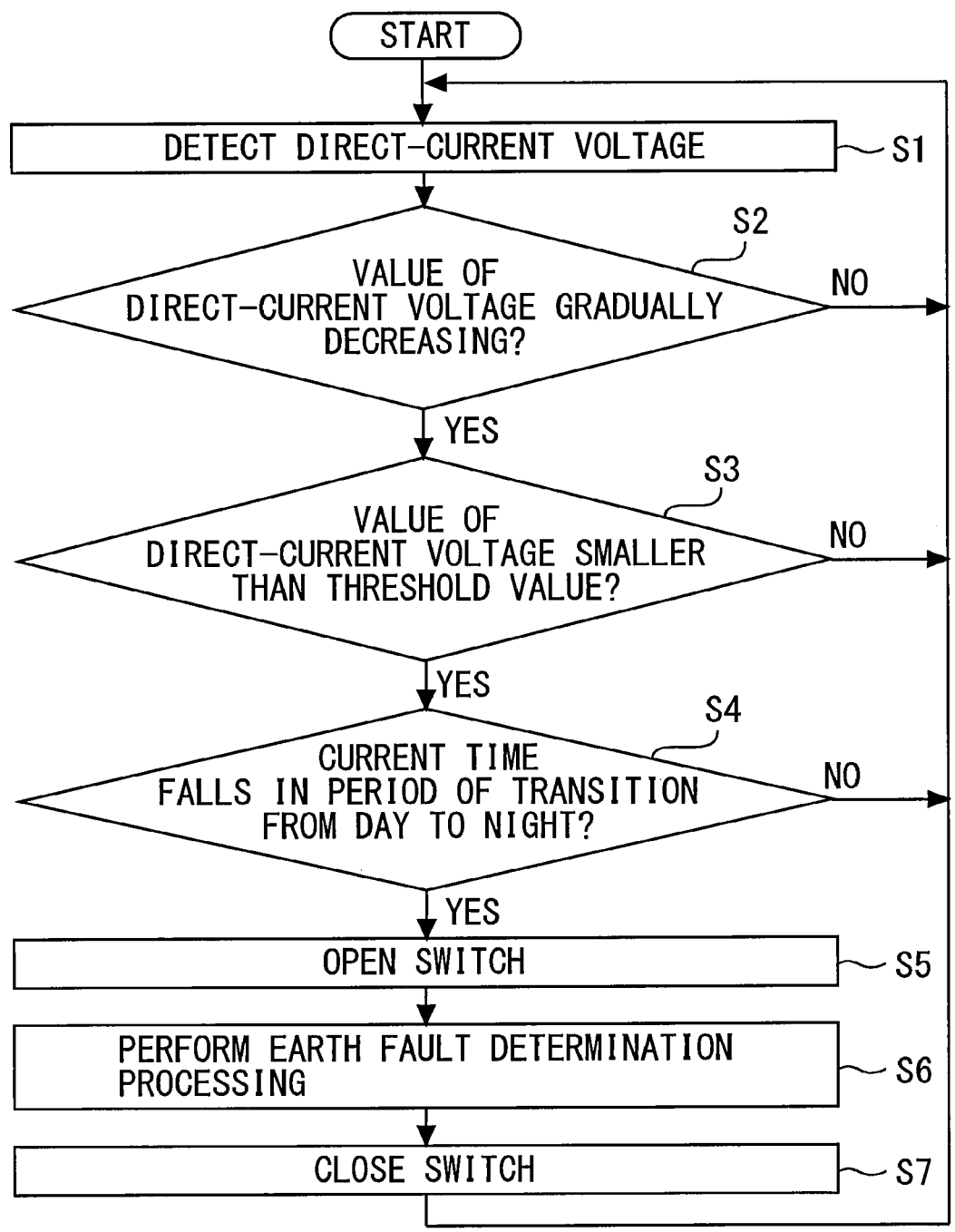
FIG. 4 is a flowchart for describing an overview of an operation of the control device for an electric power conversion apparatus according to Embodiment 1 of this invention.

FIG. 4 is a flowchart for describing an overview of operation of the control device for an electric power conversion apparatus according to Embodiment 1 of this invention.

In step S1, the control device 9 detects a direct-current voltage output from the solar cell module 2. Subsequently, the control device 9 performs the operation in step S2. In step S2, the control device 9 determines whether or not a value of the direct-current voltage is gradually decreasing.

In step S2, if the value of the direct-current voltage is not gradually decreasing, the control device 9 performs the operation in step S1. In step S2, if the value of the direct-current voltage is gradually decreasing, the control device 9 performs the operation in step S3.

In step S3, the control device 9 determines whether or not the value of the direct-current voltage is smaller than a threshold value.

In step S3, if the value of the direct-current voltage is not smaller than the threshold value, the control device 9 performs the operation in step S1. In step S3, if the value of the direct-current voltage is smaller than the threshold value, the control device 9 performs the operation in step S4.

In step S4, the control device 9 determines whether or not a current time is a time in a period of transition from day to night based on a length of time passed from last earth fault determination.

In step S4, if the current time is not a time in a period of transition from day to night, the control device 9 performs the operation in step S1. In step S4, if the current time is a time in a period of transition from day to night, the control device 9 performs the operation in step S5.

In step S5, the control device 9 opens the switch 6. Subsequently, the control device 9 performs the operation in step S6. In step S6, the control device 9 performs processing for earth fault determination for the direct-current path 4. Subsequently, the control device 9 performs the operation in step S7.

In step S7, the control device 9 closes the switch 6 at a preset timing. Subsequently, the control device 9 performs the operation in step S1.

According to Embodiment 1 described above, the control device 9 determines whether or not an earth fault has occurred in the direct-current path 4 when the switch 6 is open. Therefore, it is possible to, in the system in which the direct-current path 4 between the solar cell module 2 and the electric power conversion apparatus 3 is grounded via the switch 6, detect occurrence of an earth fault in the direct-current path 4.

Also, if the value of the direct-current voltage is smaller than the preset threshold value, the control device 9 performs earth fault determination. Therefore, a length of time of operation of the electric power conversion apparatus 3 can be maximized.

Also, the control device 9 performs earth fault determination during a gradual decrease of the value of the direct-current voltage detected by the direct-current voltage detection unit 9a to zero. Therefore, earth fault determination can properly be performed using the direct-current voltage from the solar cell module 2.

Also, the control device 9 determines whether or not to perform earth fault determination, based on the length of time passed from last earth fault determination. Therefore, it is possible to prevent earth fault determination from being made during day in which the electric power conversion apparatus 3 is in full operation. Also, it is possible to prevent erroneous earth fault determination due to an error in time setting. Also, it is possible to prevent erroneous earth fault determination due to a power generation start time of the solar cell module 2 varying depending on the region. Also, it is possible to prevent erroneous earth fault determination due to a power generation start time of the solar cell module 2 varying depending on the season.

Also, the control device 9 may close the switch 6 before the value of the direct-current voltage becomes zero. In this case, a failure of the electric power conversion apparatus 3 can be suppressed.

Also, the control device 9 may close the switch 6 when the value of the direct-current voltage is gradually increasing after the value of the direct-current voltage becoming zero. In this case, a failure of the power supply system can be suppressed in its entirety.

Figure 5:
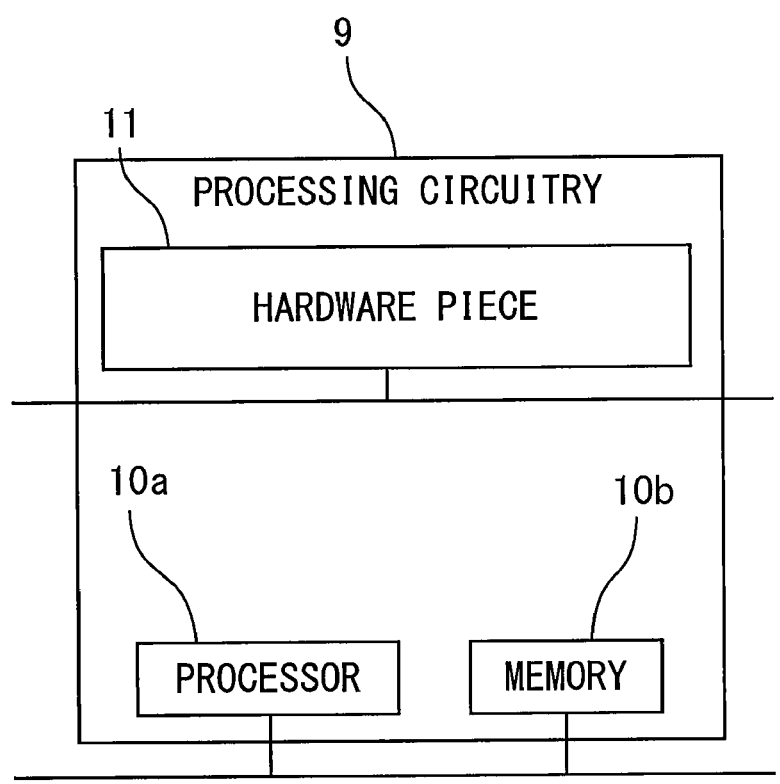
FIG. 5 is a diagram of a hardware configuration of the control device for an electric power conversion apparatus according to Embodiment 1 of this invention.

Next, an example of the control device 9 will be described with reference to FIG. 5. FIG. 5 is a diagram of a hardware configuration of the control device for an electric power conversion apparatus according to Embodiment 1 of this invention.

Each of the functions of the control device 9 can be implemented by processing circuitry. For example, the processing circuitry includes at least one processor 10a and at least one memory 10b. For example, the processing circuitry includes at least one dedicated hardware piece 11.

If the processing circuitry includes at least one processor 10a and at least one memory 10b, each of the functions of the control device 9 are implemented by software, firmware or a combination of software and firmware. At least one of the software and the firmware is described as a program. At least one of the software and the firmware is stored in the at least one memory 10b. The at least one processor 10a implements each of the functions of the control device 9 by reading and executing the relevant program stored in the at least one memory 10b. The at least one processor 10a is also referred to as a CPU, a central processing unit, a processing unit, an arithmetic unit, a microprocessor, a microcomputer or a DSP. For example, the at least one memory 10b is a non-volatile or volatile semiconductor memory such as a RAM, a ROM, a flash memory, an EPROM or an EEPROM or a magnetic disk, a flexible disk, an optical disk, a compact disc, a mini disc, a DVD or the like.

If the processing circuitry includes at least one dedicated hardware piece 11, the processing circuitry is implemented by, for example, a single circuit, a composite circuit, a programmed processor, a parallel-programmed processor, an ASIC, an FPGA or any combination thereof. For example, each of the functions of the control device 9 is implemented by relevant processing circuitry. For example, the functions of the control device 9 are collectively implemented by processing circuitry.

Some of the functions of the control device 9 may be implemented by the dedicated hardware piece 11 and the others may be implemented by software or firmware. For example, the function of the grounding control unit 9b may be implemented by processing circuitry that serves as the dedicated hardware piece 11 and each of the functions other than the function of the grounding control unit 9b may be implemented by the at least one processor 10a reading and executing the relevant program stored in the at least one memory 10b.

As described above, the processing circuitry implements the functions of the control device 9 using the hardware piece 11, software, firmware or any combination thereof.

INDUSTRIAL APPLICABILITY

As described above, a control device for an electric power conversion apparatus according to this invention can be used for a system that, in a system in which a direct-current path between a solar cell module and an electric power conversion apparatus is grounded, detects occurrence of an earth fault in the direct-current path.

REFERENCE SIGNS LIST 1 power system
2 solar cell module
3 electric power conversion apparatus
4 direct-current path
5 alternate-current path
6 switch
7 voltage detection device
8 earth fault detection device
9 control device
9a direct-current voltage detection unit
9b grounding control unit
9c earth fault determination unit
10a processor
10b memory
11 hardware

The invention claimed is:
1. A control device for an electric power conversion apparatus, the control device comprising:
a grounding control unit configured to, in a system in which a direct-current path between a solar cell module and an electric power conversion apparatus is grounded via a switch, control the switch;
a direct-current voltage detection unit configured to detect a direct-current voltage output from the solar cell module; and an earth fault determination unit configured to, when the switch is open under the control of the grounding control unit, determine whether or not an earth fault has occurred in the direct-current path, wherein during a gradual decrease of the value of the direct-current voltage detected by the direct-current voltage detection unit to zero, when the direct-current voltage detection unit detects the direct-current voltage having a value that is smaller than a preset threshold value and the grounding control unit determines that a current time is a time in a period of transition from day to night based on a length of time passed from a last earth fault determination, the grounding control unit opening the switch and subsequently closing the switch before the value of the direct-current voltage detected by the direct-current voltage detection unit becomes zero.

* * * * *